United States Patent
Salminen

(10) Patent No.: US 6,463,286 B1
(45) Date of Patent: Oct. 8, 2002

(54) METHOD, EXCHANGE, TELECOMMUNICATION SYSTEM AND MOBILE STATION FOR TEMPORARY SELECTIVE NATIONAL ROAMING AT PREDETERMINED NETWORK OPERATION CONDITIONS IN A MOBILE RADIO COMMUNICATION SYSTEM

(75) Inventor: Reijo Salminen, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/362,985

(22) Filed: Jul. 30, 1999

(30) Foreign Application Priority Data

Jul. 31, 1998 (DE) .......................... 198 34 674

(51) Int. Cl.$^7$ ................................. H04Q 7/20
(52) U.S. Cl. .................... 455/453; 455/432; 455/435; 455/436; 455/439; 455/560
(58) Field of Search ................ 455/432, 435, 455/436, 438, 439, 453, 560

(56) References Cited

U.S. PATENT DOCUMENTS

| 4,737,978 A | * | 4/1988 | Burke et al. ................ 379/60 |
| 6,055,433 A | * | 4/2000 | Yuan et al. ................ 455/453 |
| 6,148,201 A | * | 11/2000 | Ernam et al. ............... 455/433 |

FOREIGN PATENT DOCUMENTS

| EP | 595786 | 7/1988 | |
| EP | 724368 | 7/1996 | |
| EP | 0 724 368 A | * 7/1996 | ............ H04Q/3/00 |
| JP | 06269040 | 9/1994 | |
| WO | WO96/12380 | 4/1996 | |
| WO | WO96/25015 | 8/1996 | |
| WO | WO96/28947 | 9/1996 | |
| WO | WO98/52375 | 11/1998 | |
| WO | WO99/04511 | 1/1999 | |

OTHER PUBLICATIONS

Rainer Bremer; IEEE publication 'Inter–PLMN Handover . . . ; Nov. 1995, pp. 442–446; Bonn, Germany.*
Digital cellular telecommunications system (Phase2 + ) Mobile–services Switching Center–Base Station System (MSC–BSS) interface; Layer 3 specification in ETSI GSM 08.08, Nov., 1996.
Digital cellular telecommunications system; Service accessibility, ETSI GSM 02.11 version 5.0.0, Nov., 1996.

(List continued on next page.)

*Primary Examiner*—Edward F. Urban
*Assistant Examiner*—Meless Zewdu
(74) *Attorney, Agent, or Firm*—Burns, Doane, Swecker & Mathis, L.L.P.

(57) ABSTRACT

The invention relates to a method, an exchange, a telecommunication system and a mobile station for providing a temporary selective national roaming at predetermined network operation conditions, e.g. at network overload in a mobile radio communication system. A first switching means (MSC/VLR) of a home network (HPLMN) performs a negotiation with a second switching means (MSC/VLR') of another network (VPLMN) which has free capacity to handle mobile stations (MS1–MS4) of the first network (HPLMN) which cannot be handled by said first network (HPLMN) during e.g. an overload condition occuring therein. When e.g. the overload condition occurs, a request message (RM) is first sent to the second switching means (MSC/VLR') in order to enquire whether the second network (VPLMN) has enough free capacity to take over mobile stations (MS1–MS4) from the first network (HPLMN). Thus, it can be ensured that mobile stations (MS1–MS4) of the first network (HPLMN) do not cause an overload condition in the second network (VPLMN) when they have been registered in the second network (VPLMN) and receive a service therein.

71 Claims, 5 Drawing Sheets

Temporary Transfer for Mobile Stations

OTHER PUBLICATIONS

Digital cellular telecommunications system (Phase2 + ) Functions related to Mobile Station (MS) in idle mode and group receive mode, ETSI GSM 03.22, version 5.2.0., Aug., 1997.

Bremer, Rainer. "Inter–PLMN Handover—An Approach for a Functional Requirement Description" 1995 Fourth IEEE International Conference on Universal Personal Communications Record, Gateway to the $21^{st}$ Century, Nov. 6–10, 1995, pp. 442–446, XP000689990.

* cited by examiner

METHOD, EXCHANGE, TELECOMMUNICATION SYSTEM AND MOBILE STATION FOR TEMPORARY SELECTIVE NATIONAL ROAMING AT PREDETERMINED NETWORK OPERATION CONDITIONS IN A MOBILE RADIO COMMUNICATION SYSTEM

This application claims priority under 35 U.S.C. §§119 and/or 365 to 198 34 674.3 filed in Germany on Jul. 31, 1998; the entire content of which is hereby incorporated by reference.

BACKGROUND

The invention generally relates to the provision of a temporary selective national roaming at predetermined network operation conditions, e.g. at network overload in a mobile radio communication system. In particular, the invention relates to a method, an exchange, a telecommunication system and a mobile station of a mobile radio communication network, wherein one or more mobile stations of a first mobile radio communication network are transferred to a second mobile radio communication network, when an overload condition occurs in the first mobile radio communication network. There is also the possibility that the mechanism is invoked by maintenance personnel, e.g. due to some very severe maintenance activities or at an exchange or network failure.

FIG. 4 shows an overview of a nationwide telecommunication system TELE, where several mobile radio communication networks HPLMN, VPLMN1, VPLMN2 . . . VPLMNn (e.g. a D1, D2 or E-Plus network) can co-exist. Whilst FIG. 4 shows the co-existence of the networks, it should be understood that, of course, geographically the networks may cover the same geographical areas. Each mobile station MS (or generally a subscriber station) has a particular subscription to one of the networks. Such subscription data is stored in the home location register HLR. The mobile stations MS are served by respective switching means MSC/VLR within the networks. The switching means comprises the mobile switching center MSC and a visitor location register VLR. Other means necessary for forming the communications between the mobile station MS and the switching center MSC/VLR, like the base station controllers BSCs, the base transmitter stations BTS and the base stations BS, of the individual networks are not illustrated in FIG. 4, however, of course, it is assumed that the communication between the mobile station MS and the switching means MSC/VLR and the home location register HLR is performed as in any standard GSM network. Since all mobile radio communication networks and the mobile stations themselves must comply with the GSM standard (or any other nationwide standard), of course, the mobile stations MS, MS' can in principle perform communications in every network.

When quality of service of a mobile network is below an acceptable level due to lack of resources in the network, the network is considered to be in an overload condition. The resources can consist of processing power, memory, switching, radio or other resources. In such an overload condition, two serious traffic conditions can occur. Firstly, the complete network traffic handling capability may collapse such that all mobile stations currently registered within this network will have very poor grade of service from the network. Secondly, if a mobile station is just about to register in the network, its call setup request may be rejected. In this condition, the mobile stations can normally only perform emergency calls (112) and nothing else. In one alternative solution, currently supported by GSM, it is conceivable that the mobile station is adapted to select one of several networks through a key and a display on the mobile station, in which case the operator of the mobile station may manually select a new network once its call setup request has been rejected by the network. If the other network does not support the mobile station even temporarily then no further communication is provided for said mobile station, since either national roaming is not allowed or the second network has a high load due to many mobile stations attempting to select this network.

In a conventional mobile radio communication network according to the GSM standard, some provisions to handle overload conditions are made.

Firstly, there is the possibility to reduce the load in the network simply by restricting accesses from mobile stations, e.g. to simply reject further call setup requests by mobile stations which would cause a collapse of the network. The procedure as described in the ETSI GSM standard 08.08 (digital cellular telecommunication system (phase 2+), mobile-services switching center-base station system (MSC-BSS) interface; layer 3 specification) section 3.1.12.3, November 1996 and ETSI GSM 02.11 version 5.0.0 (digital cellular telecommunication system; service accessibility) section 4, November 1996, can be used. In such a procedure, an access of mobile stations to the network is restricted based on the so-called access classes of the subscribers. The ETSI GSM standards define access classes for particular groups of subscribers in accordance with the defined subscriptions. For example, access classes can be grouped according to the subscribed tariffs, such that an access to the network may be blocked for the group of private users whilst a group of business users may still obtain an access. Other definitions of the groups of subscribers or access classes are possible. During an overload condition, the subscribers belonging to one particular access class will not receive a service, if they are registered in their home public land mobile network HPLMN (see FIG. 4). If in such a situation there are no further services offered to this group of subscribers, they will not have service, sometimes not even an emergency service, since in GSM it is possible to define with the above-stated mechanism whether normal users are allowed to make emergency calls or not.

Rather than just completely rejecting an access to the network, another option to use in GSM is the national roaming option described in the ETSI GSM standard 03.22 version 5.2.0 (digital cellular telecommunications system (phase 2+); functions related to mobile stations (MS) in idle mode and group receive mode), August 1997. By contrast to the international roaming service, which is a service whereby a mobile station from a mobile network is able to obtain a service from a mobile network of another country that has a roaming agreement with the home network (when the roaming is allowed for the subscriber) the national roaming service is a service, whereby a mobile station of a given mobile network is able to obtain a service from another mobile network in the same country, anywhere or even on a regional basis. The availability of national roaming depends on the home mobile network and the visited mobile network and does not depend on the subscription arrangements.

Essentially, as is shown in FIG. 4, during an overload condition the mobile station MS can roam to another network VPLMN1 (hereinafter called the visited or second network) in the home PLMN country. When this mobile station MS' is temporarily served by the switching means MSC/VLR of the visited network VPLMN1, the mobile station will periodically perform attempts to register back to its home network HPLMN. If several visited networks VPLMN1, VPLMN2 . . . VPLMNn exist, the mobile station MS may attempt to gain an access in a particular network.

FIG. 5 shows the national roaming service for a group of mobile stations MS1, MS2, MS3, MS4 served by a switching means MSC1 of the network HPLMN. As shown in FIG. 5, two switching means MSC1, MSC2 of two location areas LA1, LA2 respectively serve a number of mobile stations. The location area LA of the visited network VPLMN geographically overlaps with some of the location areas of the home network HPLMN. If a mobile station does not get service in the home network HPLMN, e.g. in the overload area OVLD-AR, the mobile stations MS1–MS4 attempt to roam into one of the switching means MSC1', MSC2' of the visited network VPLMN, depending on at which location area of the VPLMN they are at the moment. Of course, the switching means MSC1', MSC2' may already be serving some mobile stations MS1'–MS4', which have a subscription in the visited network VPLMN (It is noted that, e.g. GSM 03.02,5.1.0, May 1996, defines as MSC area the part of the network covered by an MSC which may consist of one or more location areas, such that one LA is only served by 1 MSC).

Whilst the national roaming service in principle allows a mobile station, which can currently not be handled within its own home network HPLMN, to access a visited network VPLMN, the disadvantage is that the number of mobile stations cannot be controlled more than on a regional basis; i.e. the mobile stations MS1–MS4 will access the switching means MSC1', MSC2' which is serving their present location.

If the home network HPLMN goes down, especially due to the overload condition, and some or all mobile stations are allowed to roam to another network VPLMN according to their own choice, this may cause a high traffic and even the new network VPLMN or all other networks VPLMN1, VPLMN2 . . . VPLMNn might end up in a severe overload condition. For example, in FIG. 5 the switching means MSC1' of the visited network VPLMN in the location area LA might immediately become overloaded when all mobile stations MS1–MS4 simultaneously decide to temporarily roam to this switching means. On the other hand, some of the mobile stations, which are the first to request an access in the visited network VPLMN, may still be served, whilst those mobile stations, which only later request an access, will be rejected. Thus, there is no guarantee that the mobile stations which have already been rejected by their home network will be handled by the desired visited network VPLMN or an overload condition might even be caused in the visited network VPLMN. Since it cannot be ensured that these two problems might occur, the national roaming service is in most cases not used. Furthermore, the mobile station may not have the permission to use national roaming at all. The same problem can occur if the operator is operating several networks that overlap and the mobile stations have multi-band functionality, e.g. GSM 900/1800.

Furthermore, there may exist other situations and conditions in the home network which may require a flexibility to at least temporarily use services from one or more other networks. For example, one or a plurality of users served by an MSC may have to be transferred only temporarily to another network if a MSC undergoes maintenance. Therefore, many conditions in the home network may require the flexible access to services of another network.

SUMMARY

The invention has been devised to overcome the disadvantages described above in the current GSM standards relating to the national roaming service. In particular, it is the object of the invention to provide a method, an exchange, a telecommunication system and a mobile station, such that mobile users can be provided with a flexible access to services of several networks.

This object is solved by a method according to claim 1. Furthermore, this object is solved by a telecommunication system according to claim 21. Furthermore, this object. is solved by an exchange according to claim 37. The object is also solved by a mobile station according to claim 46.

According to the invention, the switching means of the (first) home network and the switching means of the (second) visited network perform an exchange of request and response messages when a predetermined condition, e.g. an overload condition, occurs in the home network. Thereby, the home network and the visited network negotiate as to whether or not the visited network is capable of handling traffic for one or more mobile stations of the home network, which cannot be handled in their own network. In particular, the switching means of the visited network returns a response message to the switching means of the home network to indicate whether or not it will and can grant an access to a particular number of mobile stations of the home network. Those mobile stations which have been indicated can then be registered in the visited network and are therefore guaranteed a flexbile access in the network. Thus, the national roaming can be controlled on a gradual basis and it is avoided that mobile stations are granted access merely on a statistical basis as in the conventional national roaming service. At the same time the access is granted without causing an overload in the visited network.

Preferably, the request message sent by the switching means of the home network to the switching means of the visited network can contain the number of mobile stations and/or the access classes of the mobile stations and/or information about the overloaded area in said home network. Thus, the switching means of the visited network can advantageously decide whether or not it has the capacity to handle a particular set of mobile stations.

Preferably, the request message is sent to two or more switching means of the visited network. Since the traffic conditions may vary among several switching means of the visited network, the success rate of transferring a large number of mobile stations to the visited network can thus be increased. Furthermore, the several switching means may respectively take over a certain number of mobile stations for a predetermined access class of mobile stations, such that the increased load in the visited network can be distributed amongst a plurality of switching means.

If several second networks are provided which can potentially take over a certain number of mobile stations, the request message may also be sent simultaneously to one or more switching means in each visited network. This can achieve an even load distribution amongst a plurality of visited networks.

The switching means of the home network may also advantageously determine on the basis of the access classes, to which switching means or second network the request message should be transferred. Since some visited networks may provide special functionalities for mobile stations of a particular access class, the switching means of the home network can advantageously attempt to transfer mobile stations of a particular access class to a second network which has been specifically adapted for handling such an access class. Furthermore, the switching means of the home network may also send several request messages each containing a particular number of mobile stations of a particular access group separately to several different switching means in one visited network.

Preferably, the switching means of the home network may send an overload message to the base station controllers of the home network indicating that a roaming is allowed for one or more mobile stations, preferably according to a particular access class. The base station controller can thus transfer the overload message to the respective mobile stations indicated therein, preferably to all mobile stations of a particular access class.

Preferably, the overload message indicates the visited network and/or a particular switching means within the visited network, to which the indicated mobile stations are allowed to roam. In particular, when the switching means of the home network receives several response messages from several switching means located in one or more visited networks, then a plurality of overload messages can be transferred to subgroups of mobile stations, wherein each subgroup or access class will receive an indication to which visited network and/or switching means the mobile stations are allowed to roam. Thus, particular groups of mobile stations of the home network, possibly located in the same location area or in a different location area, may be transferred to the same or the different local area in the visited network.

Preferably, a copy of the subscriber data of the mobile stations which cannot be handled by said first network stored in the home location register of the first network is sent to the switching means of the visited network. Thus, the mobile station which cannot be handled in the first network, obtains an access in the visited network.

When the mobile station has been registered in the visited network and can communicate using the switching means of the visited network, the mobile station can also perform repeated re-registering requests to re-register in the switching means of its home network, such that the mobile station may be advantageously re-registered in its home network even before a stop message indicating the end of the overload condition is received from the switching means of the home network.

When a mobile station has been registered in the visited network, the switching means of the visited network can determine allowable location areas or cells in said visited network, in which said mobile station is allowed to roam. Since the overload condition may not prevail for an unlimited period of time, there is thus no need to allow the transferred mobile station to occupy resources in all cells of the visited network, such that the transferred mobile station does not present an additional load in all cells of the visited network.

When the mobile station moves outside said allowable location area, the switching means of the visited network may either continue the call, perform an inter-network handover to the home network or to yet another visited network or it may release the call which the transferred mobile station carries out. Thus, a suddenly increasing load in other cells which may be heavily occupied can be avoided.

When several visited networks are provided, the switching means of the home network can scan several visited networks if a first visited network has refused to take over the mobile station during the overload condition. The switching means of the home network may also negotiate with the respective switching means of several visited networks which second network is to take over a particular number or a particular access class of mobile stations. Thus, the switching means of the visited network can scan several visited networks until all mobile stations which can not be handled due to the overload condition will be taken over by one or more visited networks.

When it is detected that the overload condition has ended in the home network, the switching means of the home network sends a stop message to the visited network whereupon the switching means of the visited network withdraws the access permission for the mobile stations. The mobile stations then re-register in their home network, preferably at the same switching means from which they have left the home network. Of course, if the mobile station has roamed to another cell due to a distance movement, then the mobile station might re-register at a different switching means from which it has originally departed.

Preferably, the subscriber data in the switching means (visitor location register) in the visited network is canceled only after location information contained in an update location information message is checked against the location information in the home location register stored when the subscriber was registered in the visited network. This ensures that the subscriber data stored in the visitor location register of the visited network is only canceled when the mobile station is successfully re-registered in its own home network, such that the mobile station will never end up in a condition where it is not registered anywhere.

A mobile station can preferably receive an overload message from a base station controller which indicates that an overload condition has occurred in the home network and for indicating to said mobile station another visited network which has agreed to take over the communication for said mobile station as long as the overload condition prevails. Since such an overload message already indicates a visited network which has agreed to take over the communication, the mobile station can then transfer to this visited network such that it can be guaranteed that the mobile station has an access in the visited network.

Preferably, the overload message received by the mobile station contains information indicating allowable location areas in the visited network. Thus, extensive loads in particular cells can be avoided.

Furthermore, when the mobile station receives a release message from the switching means of the visited network after the overload condition has ceased in its home network, the mobile station may also send a request to the switching means of the visited network to request a transfer to yet another visited network or another particular switching means of the home network. The mobile station may also indicate a particular mobile service switching center of its own home network, such that advantageously a particular switching center can be selected.

Hereinafter, embodiments of the inventions will be described with reference to the attached drawings.

DETAILED DESCRIPTION

Figure 1:
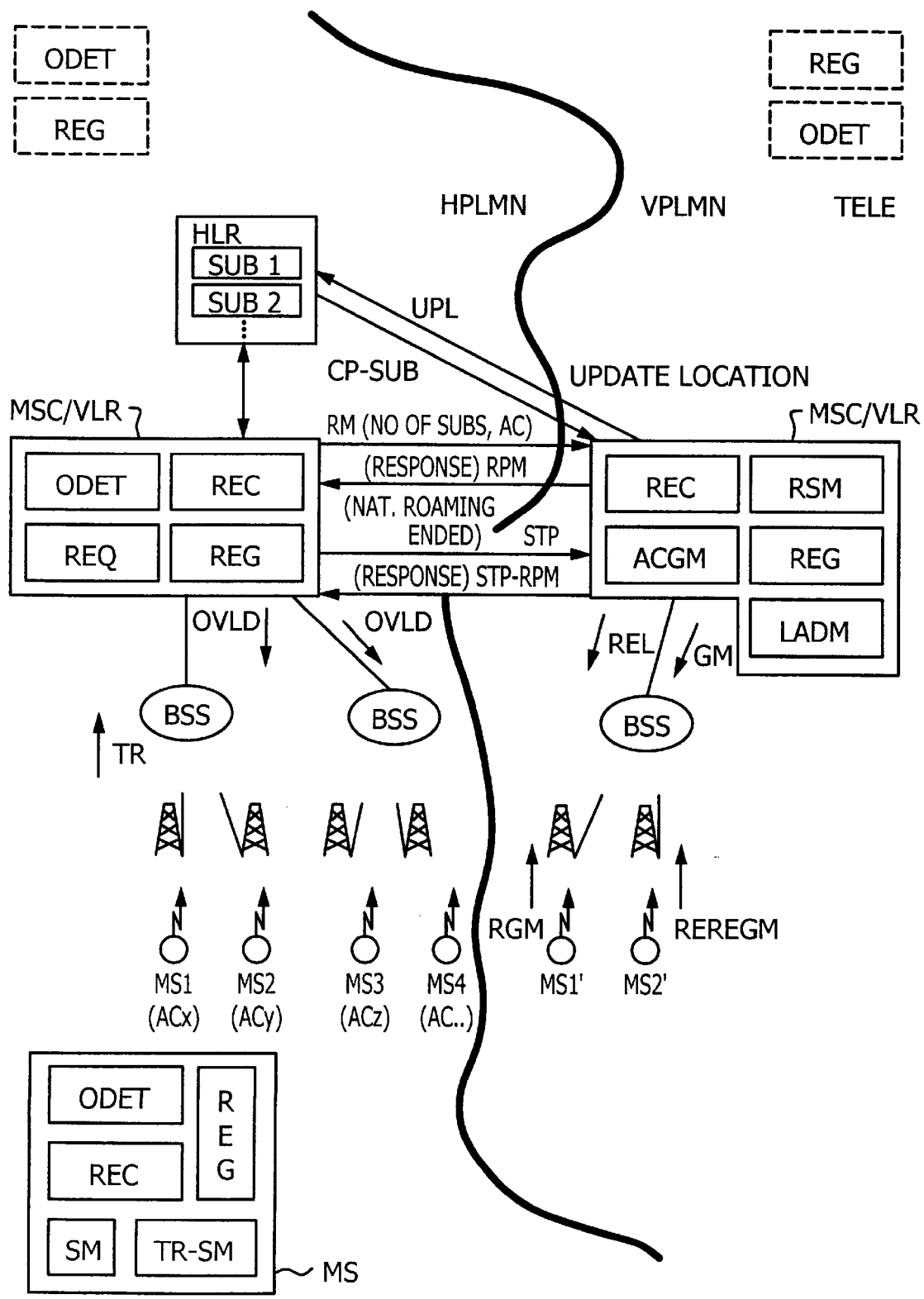
FIG. 1 shows an embodiment of the switching means MSC/VLR of the home network HPLMN, an embodiment of the switching means MSC/VLR' of the visited network VPLMN and an embodiment of the mobile station MS according to the invention.

FIG. 1 shows an overview of the telecommunication system TELE according to the invention. The telecommunication system TELE comprises a first mobile radio communication network HPLMN and at least one second mobile radio communication network VPLMN. A first switching means MSC/VLR in the first network HPLMN is formed by a mobile switching center/visitor location register MSC/VLR. A second switching means MSC/VLR' of the visited second network VPLMN is also constituted by a mobile switching center and a visitor location register MSC/VLR'. A home location register HLR stores subscriber data SUB1, SUB2 . . . of the mobile stations MS1, MS2, MS3, MS4 which have a subscription in the home network HPLMN. Although not illustrated in FIG. 1, of course also the visited network VPLMN contains such a home location register HLR for its own subscribed mobile stations. Each network HPLMN, VPLMN contains the usual devices of a mobile radio communication network such as the base station system BSS including the base station controllers BSC etc.

Although in FIG. 1 only two networks HPLMN, VPLMN are shown, it should be understood that the telecommunication system TELE is not restricted to only two networks. That is, as already generally indicated in FIGS. 4, 5, the telecommunication system TELE can also comprise several second visited networks VPLMN1, VPLMN2, VPLMNn.

Figure 5:
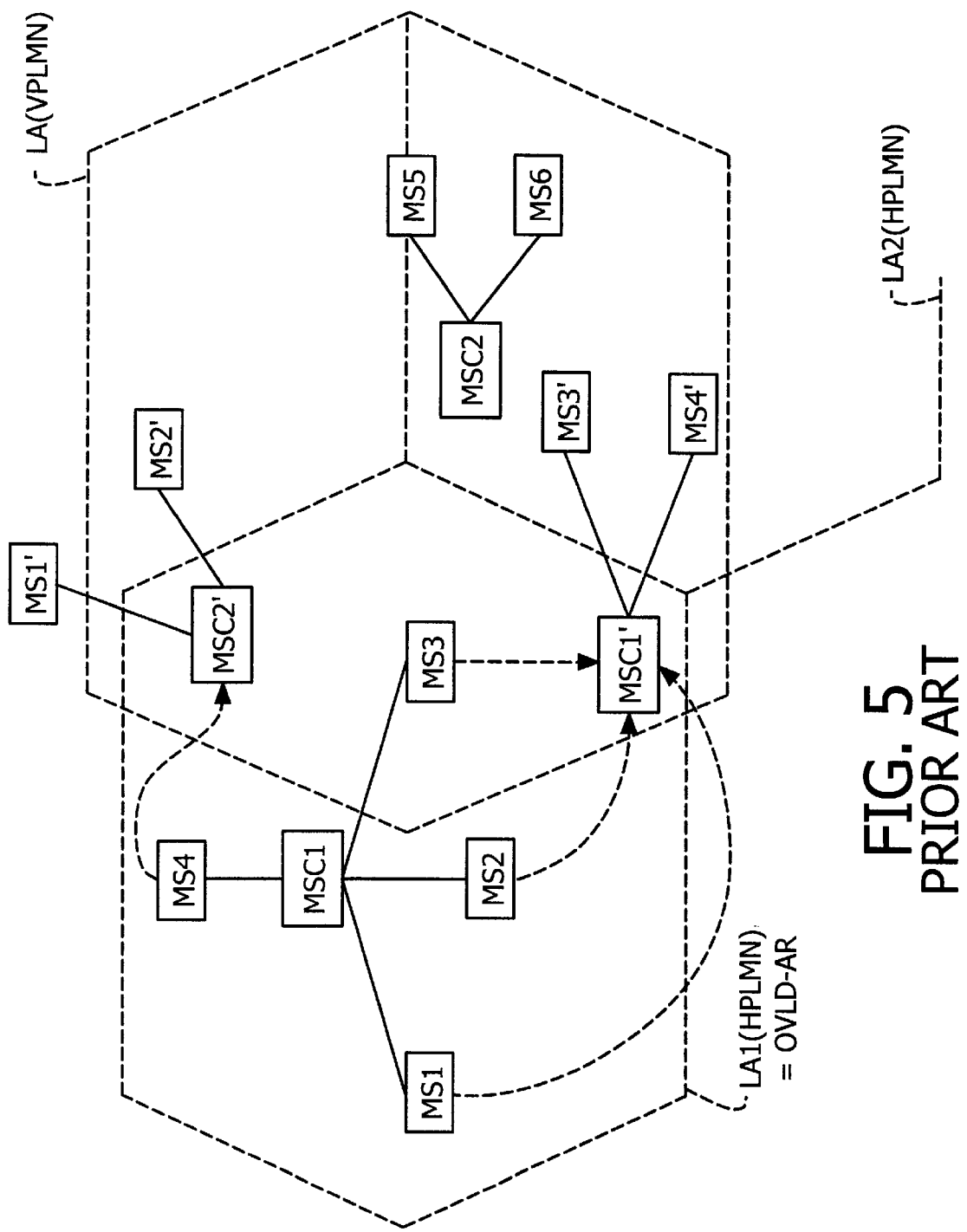
FIG. 5 shows how a number of mobile stations MS1–MS4 are transferred to mobile services switching centers MSC1', MSC2' of a visited network VPLMN, showing in particular the geographical overlap of the LAs of the home network HPLMN and the visited network VPLMN.

Furthermore, the individual cells or location areas LA (shown in FIG. 5) are not illustrated in FIG. 1, however, the individual location areas LA1, LA2 of the home network HPLMN and the location areas LA of the visited network VPLMN may overlap or not as is shown in FIG. 5.

Whilst FIG. 1 shows a situation where a network overload occurs in the first switching means MSC/VLR and where this first switching means MSC/VLR negotiates the transfer of mobile stations to the second network VPLMN (or respectively to the switching means MSC/VLR' of the second network VPLMN) it should of course be understood that also several first switching means MSC/VLR can perform such a negotiation with one or more second switching means of the visited network VPLMN. That is, since an overload condition may occur locally only within a particular overloaded area (cell), it may be necessary that two first switching means MSC/VLR simultaneously transfer mobile stations to one or more second switching means MSC/VLR'.

Furthermore, whilst hereinafter the case will be described where the predetermined condition in the first network, which causes the negotiation and switching to one or more other networks, is the overload condition, it may be noted that the invention is not restricted to such a condition. Other predetermined conditions, e.g. during maintanence of an MSC detected by a maintanence means or even a planned command by a user to switch to the other network(s) can be used. Therefore, the invention is not restricted to the overload condition and any other condition in the network can be used to trigger the switching.

The basic idea in FIG. 1 is to allow a selective national roaming for those subscribers (mobile stations) which the first home network PLMN (HPLMN) can not handle during a predetermined condition, e.g. an overload condition. As will be explained below, a prerequisite to this function is that the registration procedure is updated, so that e.g. the access class information is available in the first switching means MSC/VLR. The first switching means MSC/VLR comprises an overload detection means ODET which detects an overload condition (or generally the predetermined operation condition) in the first home network HPLMN. The overload detection means ODET may detect a local overload within the MSC area, location area LA or cell which it serves (see FIG. 5). The overload detection means ODET can also detect an overall overload condition in the first home network HPLMN. However, as is illustrated with the dashed lines in the first network HPLMN, it is also possible that the overload detection means ODET is located elsewhere in the first home network HPLMN, e.g. in a different first switching means.

The overload can e.g be detected simply when all communication resources in the first switching means are occupied by ongoing calls of mobile stations MS registered in the first home network HPLM. If a call set-up request by a mobile station MS must be rejected as a consequence of no resources being available then this already indicates an overload condition at least in the switching means of the area where the requesting mobile station MS is currently located. Other possible overload conditions may be e.g. the deterioration of transmission conditions or a complete collapse of the first mobile network due to serious operation or transmission errors. Thus, in the first mentioned case a particular number of mobile stations MS or a particular access class AC of mobile stations MS experience or see an overload in the first network HPLMN, depending if the ACs are used for prioritisation purposes in the network, whilst in the latter case all mobile stations MS of the first network HPLMN experience the overload condition.

Finally, it is also possible that the mobile station MS itself comprises an overload detection means ODET for detecting an overload condition in the first network HPLMN. E.g. if a call set-up request by the mobile station MS is rejected or delayed, the overload detection means ODET of the mobile station MS itself may detect this as an overload condition. The mobile station MS itself can then decide to either terminate the request or to transmit a transfer request to the first switching means MSC/VLR as will be explained hereinafter in more detail.

As is seen in FIG. 1, according to the invention there is an exchange of signaling messages RM, RPM between the first and second switching means MSC/VLR, MSC/VLR' in connection with the occurrence and the detection of an overload condition by the overload detection means ODET. That is, a request means REQ is provided for sending to the second switching means MSC/VLR' of the second network VPLMN a request message RM requesting that one or more mobile stations MS of that first network HPLMN, which can not be handled in said first network HPLMN due to said overload condition, be handled by said second network VPLMN. Thus, instead of just allowing mobile stations to roam to another national network VPLMN (which mobile sations may or may not be registered in the other VPLMN) according to the invention a defined and controlled transfer or handover of a selected number of mobile stations to the second network VPLMN can be performed.

The request message RM from the first switching means MSC/VLR is received in a reception means REC in said second network VPLMN. Of course, as indicated in FIG. 5, even the second switching means MSC/VLR' may already be handling communications of mobile stations which have an actual subscription to it. Therefore, after receiving the request message RM from the first switching means MSC/VLR an access grant means ACGM determines whether the second network VPLMN has actually enough capacity to handle calls of one or more mobile stations MS which can not be handled by said first network HPLMN. Thus, the second switching means MSC/VLR' does not simply return an acknowledgment message, but it actual determines whether it has enough capacity to handle the mobile stations, possibly in accordance with their access classes as will be explained below. If there is enough capacity in the second network or in the second switching means, respectively, then the access grant means ACGM grants an access for the mobile stations MS of the first network HPLMN.

The second switching means MSC/VLR' comprises a response message sending means RSM for sending a response message RPM to said first switching means MSC/VLR. This response message RPM indicates to said first switching means that said second network VPLMN will grant an access to one or more mobile stations MS of said first network HPLMN which can not be handled there due to the overload conditions. A reception means REC in said first switching means MSC/VLR receives this response message RPM from the second switching means MSC/VLR'.

If a response message RPM from said second switching means MSC/VLR' indicates that there is enough capacity to handle the mobile stations (or at least a sub-set of mobile stations) of the first network HPLMN, a registering means REG registers the one or more mobile stations MS which can not be handled in said first network HPLMN in said second network VPLMN.

As is indicated in FIG. 1, this registering means REG may be provided within the first or second network HPLMN, VPLMN, in the first or second switching. means MSC/VLR, MSC/VLR' or even within the mobile station MS. In GSM the registering means REG is provided in HLR, MSC/VLR and MS.

According to the invention, as soon as an overload condition in said first network HPLMN is detected, the first and second switching means MSC/VLR, MSC/VLR' exchange the messages RM/RPM to establish a number of mobile stations MS1–MS4 which can be handed over to the second switching means MSC/VLR' since the second switching means MSC/VLR' has indicated (via the response means RPM) that the access grant means ACGM will definitely grant an access to the transferred mobile stations MS1', MS2'. Thus, the subscribers of one mobile network can roam to another mobile network in the home country on a gradual basis, regionally or anywhere. This negotiation technique is especially useful when the mobile networks HPLMN, VPLMN geographically overlap (i.e. when their service areas LA overlap) and can be used e.g. to avoid overload but still maintain the service for the mobile stations. Through the exchange of the messages RM, RPM it can be guaranteed that the transferred mobile stations will be handled in the second network VPLMN without causing an overload condition there, because the second switching means MSC/VLR takes over the mobile stations in a controlled manner and only those mobile stations for which a negotiation was successful beforehand will be transferred to the second network VPLMN.

Two examples shall illustrate the negotiation in FIG. 1. In the above-described first case of overload (where only individual call set-up requests of mobile stations MS are rejected or only some ongoing calls of some mobile stations are interrupted) the request message RM is sent in order to transfer this sub-group of mobile stations to the second network VPLMN when the access grant means ACGM detects sufficient capacity to take over these mobile stations. The response message RPM indicates that all or some of the mobile stations can be taken over by the second network VPLMN and hence these mobile stations MS are permitted to initiate registration in the second network VPLMN. In the second example where the complete first network HPLMN breaks down, the request message RM indicates that all mobile stations are to be handed over to the second visited network VPLMN.

As already generally described above, it may also happen that the overload occurs locally only within a cell or a location area LA and if two first switching means MSC/VLR of the first network HPLMN simultaneously detect a respective overload condition in their cell, then of course each of the first switching means can send a request message RM to the second switching means MSC/VLR'. Depending on the overlapping of the cells of the networks, it is also possible that the first switching means MSC/VLR sends the request message RM to several second switching means MSC/VLR'.

When two first switching means determine simultaneously an overload, it is also possible to assign a priority to each of them, such that a switching means having a higher priority is allowed to transfer its mobile stations first to the second network.

Figure 2:
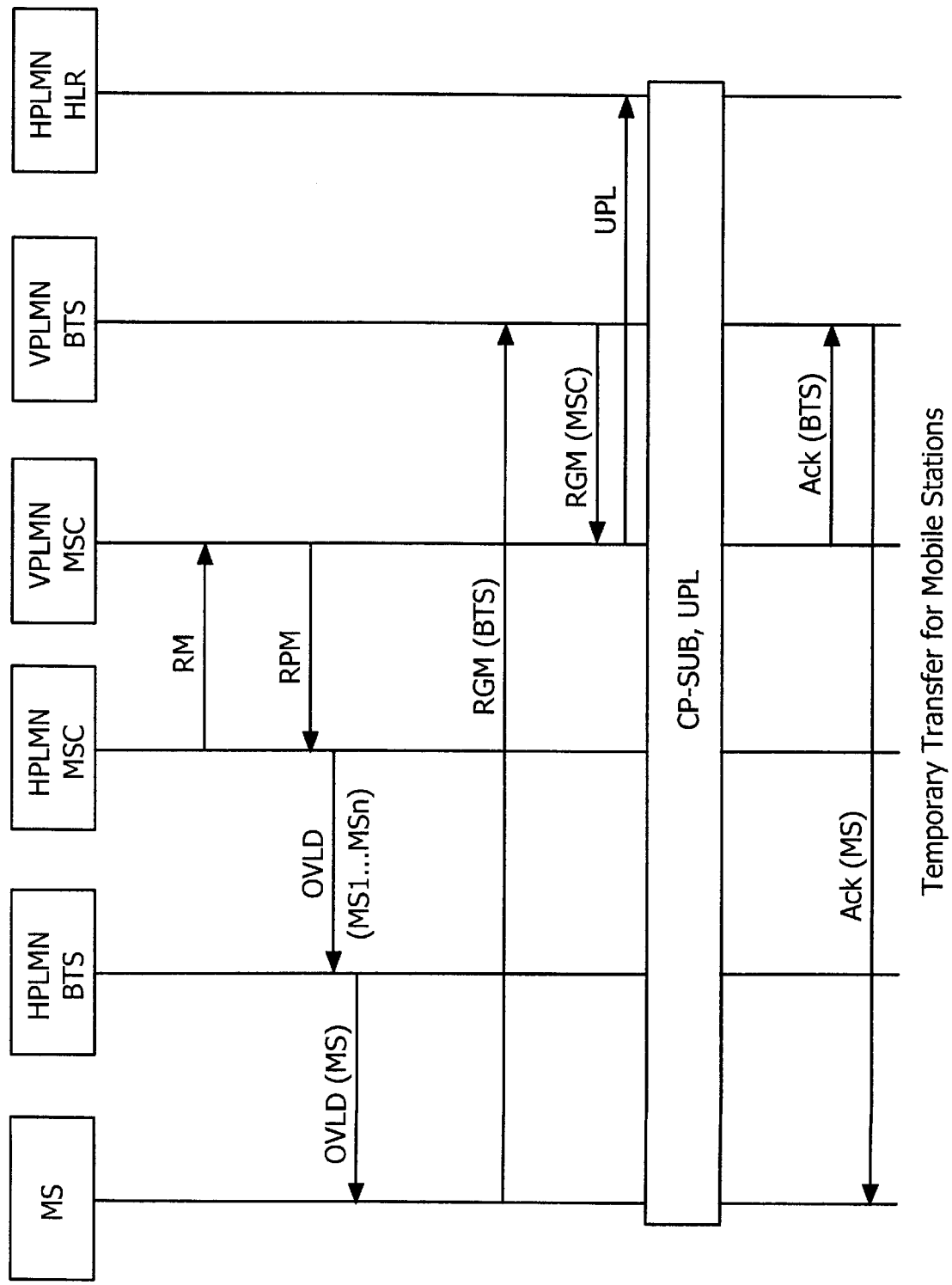
FIG. 2 shows a signal diagram of a method according to the invention for temporarily transferring one or more mobile stations of a home network to a visited network.

FIG. 2 shows an embodiment of the method according to the invention for temporarily transferring one or more mobile stations of the first home network HPLMN at overload conditions to one visited network VPLMN. In FIG. 2 MS is a mobile station which can not be handled in its home network HPLMN during a detected overload condition. HPLMN BTS denotes the base transmitter station of the home network HPLMN. HPLMN MSC denotes the first switching means MSC/VLR in FIG. 1 and VPLMN MSC denotes the second switching means MSC/VLR' of the visited network VPLMN. VPLMN BTS denotes the base transmitter station of the visited network VPLMN and HPLMN HLR denotes the home location register HLR of the home network HPLMN. Although FIG. 2 only shows one mobile station MS, it should be understood that MS can also represent an access group of mobile stations MS which is to roam to the visited network VPLMN using the temporary selective national roaming according to the invention.

After an overload detection means ODET in FIG. 1 has detected an overload condition in the first network HPLMN, the overloaded mobile switching center/visitor location register MSC/VLR of the home network HPLMN sends the request RM to the mobile switching center/visitor location register VPLMN MSC of the visited network VPLMN. In case the overload condition represents a complete breakdown of the home network HPLMN, the request message RM indicates that all mobile stations MS of the home network HPLMN should be transferred to the visited network VPLMN. In case only several mobile stations MS have experienced an overload condition (e.g. a number of mobile stations have their call set-up request rejected by the switching means MSC/VLR) the request message RM can preferably also indicate the number (No Of Subs in FIG. 1) of mobile stations MS to be handled by said second network VPLMN. If the mobile stations are grouped into particular access classes ACx, ACy, ACz the request message RM can also indicate at least one particular access class of mobile stations to be handled by said second network. Further preferably the request message RM can indicate information about the overload area OVLD-AR (i.e. the cell where the overload occurs, see FIG. 5). It is also possible that the request message RM is sent to two or more switching means MSC/VLR' of the visited network VPLMN.

Furthermore, when several second networks VPLMN1, VPLMN2 . . . VPLMNn are provided (see FIG. 4) the request message RM may also be sent to one or more switching means in each of said second networks VPLMN1, VPLMN2 . . . VPLMNn. The first switching means HPLMN MSC can also determine on the basis of the access classes of mobile stations MS to which switching means or to which plurality of switching means within one or more visited networks VPLMN1, VPLMN2 . . . VPLMNn the request message RM should be sent. For example, the first switching means may decide to request a transfer of a first access class of mobile stations to one switching means and another second access class of mobile stations to another switching means of the visited network VPLMN. It may also decide to request the transfer of one access class of mobile stations to one switching means of the network VPLMN1 and another access class of mobile stations to the switching means of the network VPLMN2 etc. Furthermore, the first switching means can even decide to split one particular access class of mobile stations between two switching means of the second network VPLMN1 or even to split one access class amongst a plurality of switching means located in several second networks VPLMN1, VPLMN2 . . . VPLMNn. Thus, the sending of the request message RM requests at one or more switching means in one or more second networks that one or more mobile stations of the home network which can not be handled in the home network due to the overload condition should be handled by at least one second network. Finally, the request message RM can also contain an indication of particular mobile stations which should be handed over to the second network.

Therefore, on the basis of particular decision criteria, such as the access class or the location where the overload occurs, the request message RM contains a number of mobile stations NoOfSubs and/or a particular access class AC of mobile stations MS which should be transferred to the second network. Essentially, the request message RM interrogates the one or more switching means of the at least one second network to find out whether the at least one second network has enough capacity to handle a particular number of mobile stations MS which can not be handled any longer by the home network HPLMN itself.

The reception means REC in the switching means of the at least one second network VPLMN receives the request message RM. The access grant means ACGM then determines whether there is enough capacity to handle the requested number of mobile stations which can not be handled by the home network HPLMN. If there is enough capacity to handle at least one mobile station which has been requested in the request message RM, a response message sending means RSM of said second switching means VPLMN MSC returns a response message RPM to the first switching means HPLMN MSC As shown in FIG. 2. The access grant means ACGM may also decide that the second switching means MSC/VLR' dependent on its own traffic conditions can only handle a subnumber of mobile stations which have been requested. In this case the response message RPM preferably indicates the number of mobile stations and/or the access class of mobile stations which can be handled in the second network.

If the request message RM or several request messages RM have been sent to one or more second switching means of one or more second networks, then of course the response messages RPM step in FIG. 2 comprises the sending and receiving of several response messages RPM from the individual switching means. Each response message RPM will then indicate a particular number of mobile stations and/or access classes of mobile stations which can respectively be handled by each interrogated switching means.

In sending the request message RM the first switching means may also use a scan means SCN for scanning several second networks VPLMN1, VPLMN2 . . . VPLMNn until one or several switching means of one or more second networks return a response message or response messages RPM which indicate respectively a number of mobile stations and/or a particular access class of mobile stations which should be transferred.

If several switching means of the first network HPLMN located in different local areas LA respectively detect an overload, it is also possible that several request messages are sent to the second switching means from different switching means of the home network. Thus, the mobile stations which experience the overload condition may be located, e.g. in the same location area LA or in different location areas LA of the home network HPLMN. In this case corresponding response messages RPM will respectively be provided to the individual switching means in the individually overloaded areas. Preferably, each second switching means can comprise a location determining means LADM for determining, e.g. allowable location areas LA, or cells in the visited network VPLMN into which the one or more mobile stations MS are allowed to roam in the visited network VPLMN.

The reception means REC of the first switching means MSC/VLR (or of the several switching means) of the home network HPLMN respectively receive the response messages RPM and can determine whether a particular number of mobile stations or a particular access group of mobile stations can be handed over to the replacement network VPLMN. Therefore, as shown in FIG. 2, the switching means HPLMN MSC sends an overload message OVLD (MS1 . . . MSn) to the base station controllers BSCs connected to the switching means of the home network PLMN. The overload message preferably contains an indication that a roaming to the visited network VPLMN is allowed for one or more mobile stations or a particular access class of mobile stations which can not be handled in the home network HPLMN due to the overload condition. If several switching means in the home network HPLMN each receive an individual response message RPM, they respectively provide several overload messages OVLD to their respective base station controllers BSCs. If the response message RPM further contains information about the visited network to which the mobile stations are allowed to roam then also the overload message OVLD can preferably contain such an indication of an allowed second network. If the first switching means HPLMN MSC receives several response messages RPM from several switching means in one or more visited networks VPLMN1, VPLMN2 . . . VPLMNn, then also the overload message OVLD provided to the base station controllers BSCs contains an information into which location area the mobile stations are allowed to roam, i.e. which particular switching means in the at least one second network will grant an access. Preferably the overload message OVLD indicates the at least one access class for which a roaming to said visited network VPLMN is allowed. Thus, the mobile stations that are allowed to roam as temporary national roamers can be from mobile stations residing in one cell up to all mobiles in the service area of the first switching means MSC/VLR.

As shown in FIG. 2, the information contained in the overload message OVLD(MS) is passed to the mobile stations MS in the BCCH channel by the base stations. Of course, the base stations provide the information contained in the overload message OVLD(MS) to those mobile stations for which the overload message indicates that a roaming to the visited network VPLMN is granted, either globally broadcasted to all MSs or individually. If a particular access class is specified in the overload message OVLD(MS) then the base station controllers will provide the roaming granting information to all mobile stations MS belonging to this particular access class. If several switching means of one or more second networks have been interrogated via one or more request messages RM, then the information provided to the individual mobile stations by the base station controllers BSC can also contain an indication to which second network and/or local area (switching means) in the second network the mobile stations or the particular access group of mobile stations are allowed to roam. All such information can be transferred to the mobile stations MS in the SYSTEM INFORMATION TYPE 1 message RACH control parameter field in case the networks comply with the GSM standard (see the GSM standard recommendation TS04.08) such that the new indication per access class, an indication that the temporary selective national roaming is allowed from the home network and the existing list of access classes can be indicated to the mobile stations MS. After the OVLD(MS) message is sent, one or more mobile stations MS of the home network HPLMN know that due the presence of the overload condition they are allowed to roam into another network VPLMN, possibly including a particular local area LA or particular switching means where they should be processed (or registered).

The mobile stations MS which belong to a particular access class AC and which do not have access any longer in their home network HPLMN clear the forbidden PLMN list from SIM and clear the forbidden LAI list (local area information list) and store the current HPLMN LAI in the forbidden LAI list and start camping into a suitable cell in the visited network VPLMN. As shown in FIG. 2, a search means SM of the mobile station MS searches the second network in order to find the suitable cell or switching means which has been indicated by the base station controllers in the home network HPLMN. If the information regarding the local area or switching means in the visited network VPLMN has not been provided by the base station controllers BSCs in the home network HPLMN, the search means SM of the mobile station MS can search the second network VPLMN until it finds the particular switching means or local area which has earlier decided to grant an access to the mobile stations (as indicated in a response message RPM).

In sending the overload message OVLD(MS) or the response message RPM, the second switching means VPLMN MSC also provides a granting message GM (see FIG. 1) to the base station controllers BSC (of the base station system BSS) which are controlling the local areas of the visited network VPLMN to where the mobile stations (the temporary national roamers) are allowed to roam. The granting message GM indicates that the temporary national roaming of mobile stations from the home network HPLMN to these local areas should be granted. Thus, the base station system BSS knows that it must give access to particular stations or particular mobile stations of one particular access class.

Thus, in the BCCH channels of the cells belonging to the areas to which mobile stations MS are allowed to roam on said second network VPLMN, the aforementioned SYSTEM INFORMATION TYPE 1 message RACH control parameter contains a new indication "temporary selective national roaming allowed to this network" and the particular access class or set of mobile stations for which this information is valid.

Thus, at this stage the second network, more specifically the base station system BSS of the second network, is brought into a condition where in principle it will grant an access to the particular mobile stations of the first network. If now the mobile stations MS1–MS4 camp into a cell served by the switching means or the base station system BSS of the visited network VPLMN, where the above-mentioned preconditions are fulfilled, they will be allowed to register and obtain an access in the visited network VPLMN.

Therefore, the mobile stations MS1', MS2' (see FIG. 1) initiate a registration procedure in the second network VPLMN by sending a registration message RGM(BTS) to the VPLMN base station system BSS. The message is needed in order to register the individual mobile stations belonging to the home network HPLMN in the visited network VPLMN, since at this point only the principle access permission has been provided in the base station system BSS. Essentially, the registration message RGM (BTS) initiates a so-called location updating procedure. Also, the analysis functions are updated to allow the mobile stations MS1', MS2' to roam in the VPLMN network. This will ensure that only the allowed mobiles are accepted to roam and the security aspects are not violated.

As shown in FIG. 2, the registration message RGM(MSC) is sent to the switching means MSC/VLR' of the VPLMN network. In sending an update location message UPL the switching means MSC/VLR' of the VPLMN network informs the home location register HLR of the mobile stations in the home network HPLMN that the mobile stations are performing a registration in the switching means MSC/VLR (more specifically in the visitor location register VLR thereof) of the VPLMN network.

When the mobile stations MS1', MS2' perform the registration procedure, the first switching means MSC/VLR of the home network HPLMN marks the mobile stations which are allowed to roam (i.e. the temporary selective national roaming subscribers) as temporary national roamers. This means that the switching means of the HPLMN network knows which of the mobile stations MS for which in principle an access permission has been given in the VPLMN network actually perform a registration procedure. On the other hand, mobiles belonging to access classes to which an access permission for temporary selective national roaming has not been granted by the VPLMN network, do not clear the LAI and the forbidden PLMN lists and are handled according to the standard GSM specifications.

On the other hand, the mobile stations MS, which register in the switching means MSC/VLR of the visited network VPLMN, are marked as temporary national roamers and as shown in FIG. 2 an update location message UPL is sent to the home location register of the HPLMN network for those mobile stations, which are granted an access in the second network. The update location message UPL for such mobile stations will include an indicator "temporary national roaming allowed". When in step ST9 the home location register HLR of the HPLMN network receives this update location message UPL, the mobile stations MS1', MS2' are registered in the home location register HLR of the home network HPLMN as temporary national roamers with the new location information identifying the new location of the mobile stations in the VPLMN network. Thus, the home location register HLR contains information about the new location of the mobile stations (i.e. where they are currently registered in the visited network VPLMN) and that a national roaming has been granted in the visited network VPLMN. By contrast to the conventional location updating procedure in the home location register HLR, the old location information for the mobile stations (subscribers) will also be kept in the HPLMN HLR. This is done in order to optimize the registration procedure when the temporary national roamers re-register back in their own HPLMN network. Furthermore, the HPLMN MSC/VLR switching means will not be informed about a location cancellation as is done in conventional location registration procedures. This is also done in order to optimize the registration back to the HPLMN for the temporary national roamers.

Furthermore, in sending the update location message UPL, to conclude the location updating process, a copy of the subscriber data SUB1, SUB2 . . . for the mobile stations is transferred in a copy message CP-SUB to the VPLMN switching means MSC/VLR', more specifically to its visitor location register VLR'. Since at this point the mobile stations of the home network HPLMN have been fully registered in the switching means MSC/VLR' of the VPLMN network and have been marked as temporary national roamers, the mobile stations MS1', MS2' receive a full service in the visited VPLMN network.

As shown in FIG. 2, an acknowledgment message ACK (BSS) is transferred from the VPLMN network switching means MSC to the VPLMN base station system BSS and from there an acknowledgment message ACK(MS) is sent to the mobile station MS (or the access class of mobile stations) which had requested the registration. Thus, the mobile station is acknowledged about the successful registration in the VPLMN network such that the mobile station knows that it will receive a full service in the VPLMN network.

Figure 4:
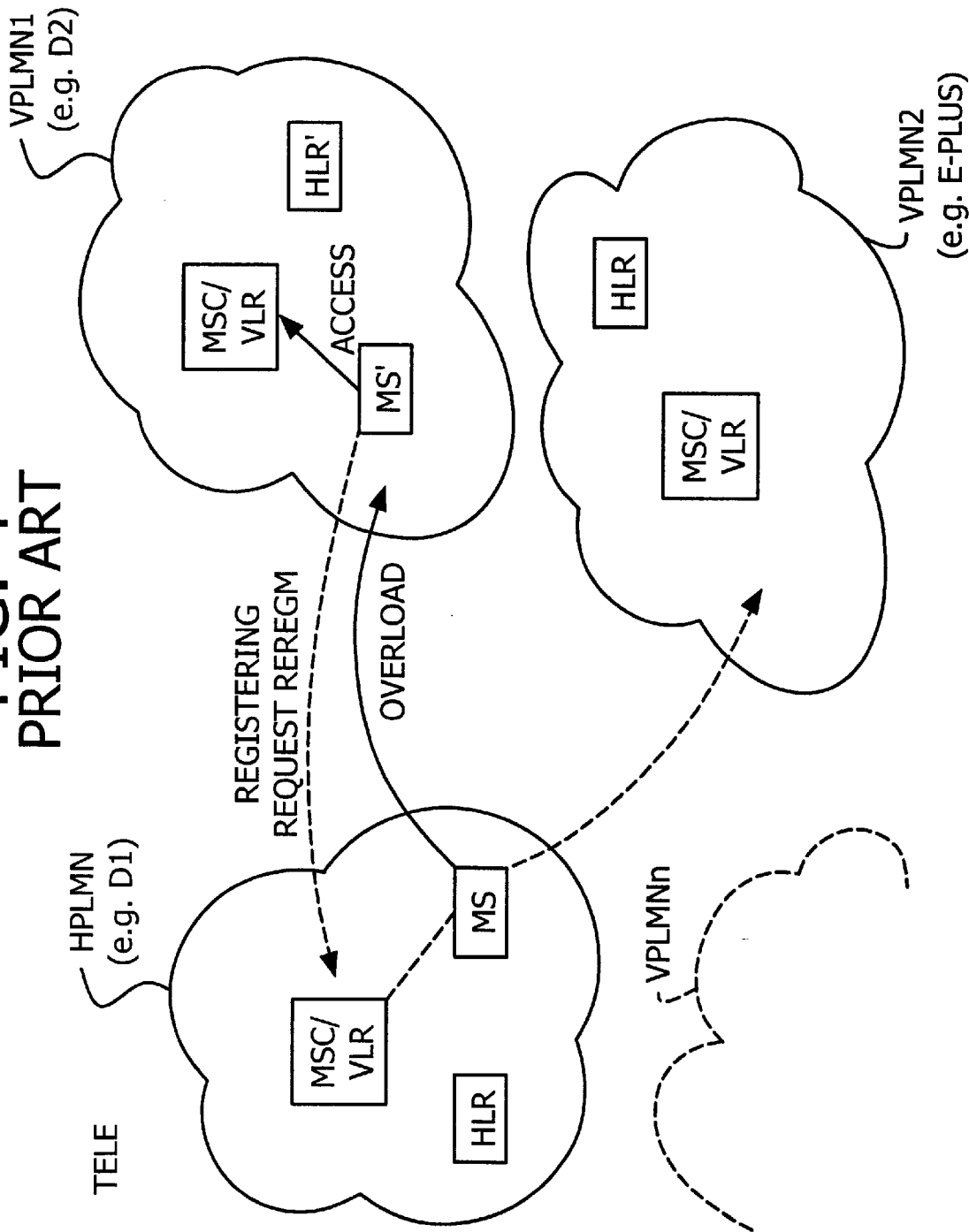
FIG. 4 shows a principle block diagram of several co-existing networks HPLMN, VPLMN1, VPLMN2 . . . VPLMNn of a telecommunication system according to the prior art.

Although in the aforementioned registration procedure only the transfer of mobile stations from one switching means in the HPLMN network to a switching means in the VPLMN network has been described, it should be understood that the same registration procedures may be carried out in several switching means of the VPLMN network, if initially several such switching means have received a request message RM. The same applies when the several switching means are located in several second network VPLMN1, VPLMN2 . . . VPLMNn as shown in FIG. 4. It should also be noted that it is not absolutely necessary that the mobile stations MS1–MS4 of the HPLMN network receive explicit information as to which local area, switching means or second network they are supposed to roam. That is, the minimum information which the mobile stations MS1–MS4 must receive in the overload message is an indication that they are allowed to roam to a second network. If the specific information regarding the local area, switching means and second network is not included, then the mobile stations MS1', MS2' perform a scanning of several local areas, several switching means or several networks, since invariably they will find a switching means whose interconnected base station system BSS has intrinsically granted an access to those mobile stations. Of course, the registration procedure can be facilitated, if the mobile station already knows to which switching means or local area it is supposed to register. If they have no such information, then the registration procedure takes slightly longer, since a search means SM of the mobile station will first have to locate the respective switching means which has granted an access.

When the mobile stations have finally been registered in the visited network VPLMN, they can perform a repeated re-registering request to the switching means of their home network HPLMN. Preferably, the mobile stations MS do so when they are in an idle state and perform no communications in the visited network VPLMN. Thus, the mobile stations periodically attempt to re-register back to their home network HPLMN by repeatedly sending re-registering requests REREGM. If the attempt is to a new location area in the HPLMN network, and in that location area the access class AC of the mobile stations MS is not allowed to have an access, and the selective temporary national roaming indication is valid, the mobile station may store that HPLMN location area in the forbidden location area list and remains registered in the VPLMN network, if that is needed to reduce the load caused by the re-registeration attempts. The MS will not perform re-registration attempts to forbidden location areas.

If the mobile station is in an active state, i.e. it is performing a communication, and it is roaming outside the area in which a temporary selective national roaming has been granted by the switching means MSC/VLR', the switching means MSC/VLR' can decide to either continue the ongoing call or to perform an inter-network handover to the home network HPLMN or to another second network VPLMN2, VPLMNn. Alternatively, the switching means MSC/VLR' can release the call, whereafter the mobile station must register back in its own home network HPLMN.

The second switching means MSC/VLR' of the VPLMN network grants an access to one or more mobile stations MS1–MS4 of the first network HPLMN initially since it has some free capacity to handle additional mobile stations at the time of receiving the request message. Of course, once the mobile stations MS1–MS4 of the HPLMN network have been registered in the VPLMN network, there may occur a situation that additional mobile stations belonging to the VPLMN network (being registered in the home location register of the VPLMN network) request an access which may be rejected due to said VPLMN network being at its capacity limits. That is, an overload condition can occur even in the VPLMN network. Then the switching means MSC/VLR' of the VPLMN network can perform an arbitration to either cancel the registration of the temporary roamers (from the HPLMN network) or to reject mobile stations belonging to the VPLMN network.

One solution is that the switching means MSC/VLR' of the VPLMN network decides to interrogate another switching means in the VPLMN network or in fact a switching means of yet another network (except for the HPLMN network) whether or not it has capacity to take over some temporary roamers which the switching means MSC/VLR' itself has taken over from the HPLMN network.

Alternatively, the switching means issues a request message to another network or another switching means to transfer some of its own mobile stations which it cannot handle due to the overload condition. The switching means MSC/VLR' can also assign priorities to individual mobile stations or access classes of mobile stations to which it has granted an access. The release or handover of mobile stations to other switching means or other second networks can then be performed on a priority basis. Thus, particular mobile stations of a higher priority will be handed over or released earlier than mobile stations with a lower priority. Thus, it can be guaranteed that the selected VPLMN network does not go into an overload condition.

When the overload detection means ODET of the switching means MSC/VLR detects that the overload condition in the HPLMN switching means has ended, the switching means MSC/VLR of the HPLMN network sends a stop message STP (see FIG. 1, 3) to the switching means MSC/VLR' of the VPLMN network. The stop message STP indicates to the switching means MSC/VLR' to end the temporary national roaming. In response thereto, the access grant means ACGM withdraws the access permission of the one or more mobile stations of the HPLMN network such that the temporary national roaming mobile stations registered in the switching means MSC/VLR' are restricted to have an access in the VPLMN network. Thus, the mobile stations MS1', MS2' re-register in their original HPLMN network.

When the stop message STP is received, the switching means MSC/VLR' sends a release message REL to the base station system BSS which relays the release message REL to the temporary selective national roamers (the mobile stations MS1', MS') The information of the end of the national roaming is sent to the mobile stations MS1', MS2' preferably in a RACH control parameter "temporary selective national roaming allowed to this network" of a SYSTEM INFORMATION TYPE 1 message of the BCCH channel. This RACH control parameter indicates to the mobile stations MS1', MS2' that the roaming in the VPLMN network is not granted any longer. Optionally there can also be indication of the access classes to which the roaming is not allowed. If the mobile stations MS1', MS2' are performing a communication, i.e. an ongoing call is present, then the mobile stations MS1', MS2' are allowed to finish this call in the VPLMN network before the access permission is finally withdrawn.

Thereafter, the mobile stations MS1', MS2' re-register back in their home network HPLMN, preferably at the same switching means MSC/VLR from which they have left the HPLMN network. After the access has been withdrawn, the second switching means MSC/VLR' returns a response message STP-RPM to the switching means MSC/VLR of the HPLMN network to indicate that the access permission has been withdrawn. The response message STP-RPM can also indicate particular mobile stations or access classes of mobile stations for which the access permission has been withdrawn in the VPMN network.

When the mobile stations register back in their HPLMN switching means MSC/VLR, a message UPL (update location) is again sent to the home location register HPLMN HLR and the location information is checked against the location information stored at the time when the mobile station was registered in the VPLMN network. Then based on this check, location cancellation messages are sent to the MSC/VLRs in the VPLMN network and preferably also in the HPLMN network from which the mobile station subscriber data needs to be cleared.

The mobile stations (subscribers) that register back to the first switching means MSC/VLR in the HPLMN network from where they have roamed to the VPLMN network are requested to perform a location updating procedure to the home location register HLR in the next radio access in order to secure that there is no discrepancy in the subscriber data in the HPLMN HLR and the HPLMN MSC/VLR.

Figure 3:
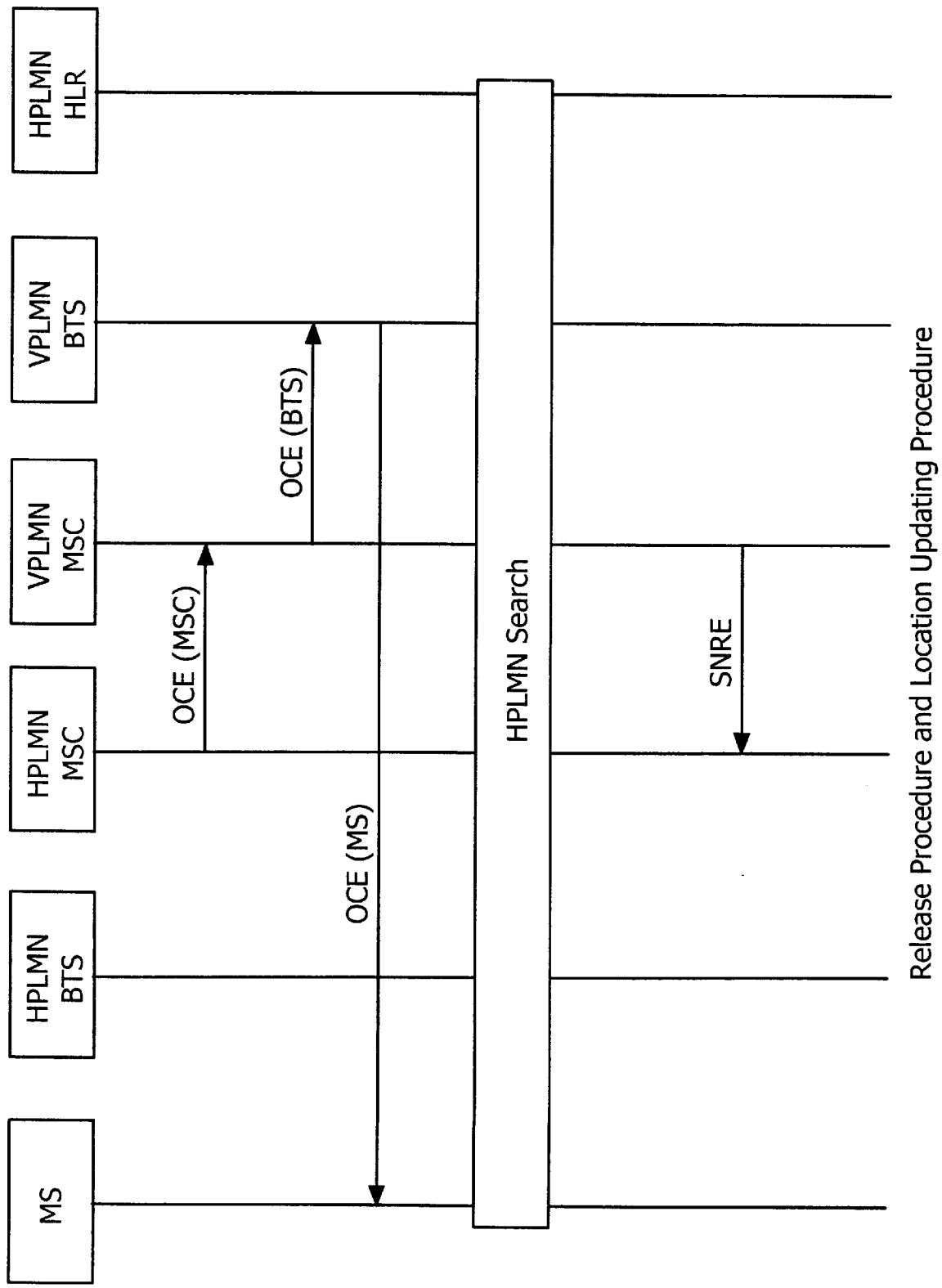
FIG. 3 shows a signal diagram showing the release procedure for re-registering a mobile station back in its original home network.

FIG. 3 shows the exchange of messages for the release procedure and the location updating procedure (OCE(MSC): The Home PLMN MSC sends a message to the other PLMNs (VPLMN) MSC that the overload condition in the Home PLMN MSC has ended; OCE(BTS): The VPLMN MSC passes the information to the VPLMN BTS; OCE (MS): The information is passed to the Mobile Station; HPLMN Search: The Mobile Station, either immediately or when becomes into idle state, searches the HPLMN network and camps into a suitable cell in the HPLMN. The registration procedure is performed and the subscriber data in the HPLMN MSC is updated from the HPLMN HLR. Also the subscriber data from the VPLMN MSCs are cleared; SNRE: A message is sent to the Home PLMNs MSC that the temporary selective national roaming has ended; for simplicity the procedures for authentication etc. are not described in the sequence) similar as in FIG. 2.

As shown in FIG. 1, the mobile station MS of the HPLMN network may itself contain an overload detection means ODET for detecting an overload condition in the HPLMN network. Preferably, the overload detection means ODET of the mobile station MS receives the overload message OVLD from a base station controller BSC of the base station system BSS as explained above. However, the overload detection means ODET may also independently detect an overload condition, namely when a call set-up request by the mobile station MS has been rejected or delayed by the switching means MSC/VLR. In such a case, a transfer request sending means TR-SM can send a transfer request TR to the switching means MSC/VLR indicating a request that the mobile station MS be handed over to the VPLMN network.

Since the mobile station MS does not know exactly whether or not a negotiation has taken place between the first and second switching means MSC/VLR, MSC/VLR' or the HPLMN network and the VPLMN network, the mobile station MS can comprise a search means SM for searching the VPLMN network, until it detects an access permission from the switching means MSC/VLR'. Thus, even before an overload message OVLD is received from the switching means MSC/VLR, the mobile station MS can perform a quick check for a faster handover.

In this case, a request means REG of the mobile station MS can actively send a registration message RGM to the switching means of the second network in order to request the copying of its subscriber data from the home location register HLR to the switching means MSC/VLR'.

During a release procedure, the reception means REC of the mobile station MS receives the release message REL from the switching means MSC/VLR' whereupon the registering means REG registers back in the switching means MSC/VLR of the HPLMN network. As explained above, the registering means REG only re-registers in the HPLMN network after an ongoing communication in the VPLMN network has ended.

Preferably, the registering means REG of the mobile station MS performs a re-registering procedure at the same switching means MSC/VLR from which it has left the HPLMN network.

Preferably, the registering means REG sends the re-registering message REREGM and an update location information message UPL to the home location register HLR of the HPLMN network.

The transfer request TR issued by the transfer request sending means TR-SM can preferably indicate the desired second network VPLMN1, VPLMN2 . . . VPLMNn to which the mobile station MS requests a transfer. Furthermore, after the release message REL is received by the reception means REC of the mobile station MS, the transfer request sending means TR-SM can also send a transfer request TR to the switching means MSC/VLR' of the VPLMN network indicating a desired other network HPLMN, VPLMN1, VPLMN2 . . . VPLMNn where a re-registering is to be performed. That is, if the mobile station MS has several subscriptions to several networks, then it can actively select one other network after having been released from the VPLMN network.

If the mobil station itself actively sends the transfer request, e.g. when its call setup has been rejected or delayed, the mobile station can carry out all the sending and receiving of messages as was previously explained for the MSC/VLR of the first network MSC/VLR. In this case, the mobile station itself negotiates whether an access can and will be granted by the desired second network. Therefore, all functions described above for the MSC/VLR of the first network can also be carried out by the mobile station.

As explained above, according to the invention a first and second switching means of a first and second network perform a negotiation during an overload condition in one network in order to hand over one or more mobile stations to another network. During the negotiation procedure, several messages are exchanged in order to detect whether the new network has enough capacity to handle several mobile stations which cannot be handled in a network during an overload condition. Thus, it can be ensured that the mobile stations are guaranteed an access in the new network.

Such a procedure and such a telecommunication system is not restricted to mobile radio communication networks according to the GSM-standard. Therefore, all descriptions that have been made above with reference to the GSM-specifications can equally well be embodied in other mobile radio communication networks operating according to other standards.

The invention as described above is not restricted to the described embodiments. Therefore, various modifications and variations of the invention can be carried out on the basis of the above teaching. In particular, embodiments that result from combinations of one or more of the attached claims are also comprised within the scope of the invention. In particular, it should be noted that the overload condition as described above is only one example of an operation condition that may be used as a trigger for a transfer. Other operation conditions, like maintenance of an MSC etc., can also be used.

Reference numerals in the claims only serve clarification purposes and do not limit the scope of the invention.

What is claimed is:

1. Telecommunication system comprising a first and at least one second mobile radio communication network, wherein one or more mobile stations of the first network are temporarily granted access in the second network at overload conditions in the first network, comprising
    in the first network:
        a) an overload detection means detecting an overload condition in the first network;
        b) a first switching means including request means for sending to a second switching means of the second network a request message requesting that one or more mobile stations of the first network which cannot be handled in the first network due to said overload condition be handled by the second network, the request message indicating the number of mobile stations to be handled by the second network; and
    in the at least one second network:
        c) a reception means for receiving said request message from the first switching means;
        d) an access grant means for determining whether the second network has enough capacity to handle calls of said one or more mobile stations which cannot be handled by the first network and for granting access for the mobile stations if there is enough capacity;
        e) a response message sending means for sending a response message to said first switching means indicating that said second network grants access to one or more mobile stations of the first network which cannot be handled during said overload conditions if said access grant means determines that the capacity is sufficient; and
    in at least one of the first and second network:
        f) a registering means for registering the one or more mobile stations, which cannot be handled in said first network, in said second network.

2. A method for temporarily transferring one or more mobile stations of a first mobile radio communication network at predetermined operation conditions to at least one second mobile radio communication network, comprising the following steps:
    a) detecting a predetermined operation condition in the first network;
    b) sending, from a switching means of the first network to at least one switching means of the second, network at least one request message requesting that one or more mobile stations of said first network be handled by the second network when said predetermined operation condition is detected, the at least one request message indicating the number of mobile stations to be handled by the second network;
    c) receiving a response message by the switching means of first network from the switching means of the second network indicating that the second network grants access to said one or more mobile stations of the first network; and
    d) registering said one or more mobile stations of the first network in the at least one second network.

3. A method according to claim 1, wherein said request message indicates at least one access class of mobile stations to be handled by the second network.

4. A method according to claim 3, wherein several second networks are provided and said switching means of the first network determines on the basis of the access classes of the mobile stations in which second network the at least one of said mobile stations of the first network should be registered.

5. A method according to claim 3, wherein several request messages are sent separately to several switching means in the second network each request message containing a number of mobile stations of a particular access group.

6. A method according to claim 1, wherein
    as the predetermined operation condition an overload condition is detected in the first network.

7. A method according to claim 6, wherein said request message indicates one or more mobile stations of the first network which cannot be handled in the first network due to said overload condition, said response message indicates that the second network grants an access to the one or more mobile stations of the first network which cannot be handled during said overload condition and the one or more mobile stations which cannot be handled in the first network are registered in said second network.

8. A method according to claim 7, wherein said request message indicates information about the overload area in the first network.

9. A method according to claim 7, further comprising
    in response to receiving said response message from the second network, sending an overload message to the base station controllers connected to the switching means of the first network indicating that a roaming to the second network is allowed for the at least one mobile stations of the first network due to said overload condition, said base station controllers providing said overload message to the mobile stations indicated therein.

10. A method according to claim 9, wherein said overload message indicates the at least one access class for which a roaming to said second network is allowed, said base station controllers providing said overload message to the mobile stations belonging to the indicated access class.

11. A method according to claim 9, wherein said overload message indicates at least one of the at least one second network to which the mobile stations are allowed to roam and a particular switching means of said at least one second networks.

12. A method according to claim 6, wherein in said step a) an operation condition detection means in the at least one mobile stations detects said overload condition if a call-setup request issued by said mobile station fails or if an on-going communication is interrupted; and
said at least one mobile stations send a transfer request to said first switching means for actively requesting a transfer to the second network.

13. A method according to claim 12, wherein said transfer request indicates the desired second network to which a transfer is requested.

14. A method according to claim 6, wherein when said mobile station receives a release message after the end of said overload conditions, said mobile station sends a transfer request to the switching means of the second network indicating a desired first network where the re-registering is to be performed.

15. A method according to claim 1, wherein as said predetermined operation condition, at least one of a maintenance condition and a switching command by at least one or more mobile users is detected in the first network.

16. A method according to claim 1, wherein in step b) said request message is sent to at least two switching means of the second network.

17. A method according to claim 1, wherein several second networks are provided and said request message is sent to at least one switching means in each second network.

18. A method according to claim 17, wherein when a mobile station, which has been registered in said second network moves outside said allowable location area, said switching means of the second network decides either to continue a call or to perform an inter-network handover to the first network or to yet another second network, or to release the call.

19. A method according to claim 1, wherein the mobile stations are located in at least one of the same location area and different location areas.

20. A method according to claim 1, wherein a copy of the subscriber data of the at least one mobile stations of the first network stored in the home location register of the first network is sent to the switching means of the second network.

21. A method according to claim 1, wherein when a mobile station of the first network is in an idle state when registered in the second network, the mobile station performs repeated re-registering requests to said first switching means.

22. A method according to claim 1, wherein after a mobile station has been registered in the second network, said switching means of the second network determines allowable location areas in the second network to which the mobile station is allowed to roam in the second network.

23. A method according to claim 1, wherein several second networks are provided and said first switching means scans said several second networks if a second network has refused to take over the mobile stations during said predetermined operation condition.

24. A method according to claim 1, wherein when it is detected that the predetermined operation condition has ended in the first network, said switching means of the first network sends a stop message to the switching means of the second network, wherein said second switching means withdraws the access granting of said at least one mobile stations of the first network, whereafter said at least one mobile stations re-register in the first network.

25. A method according to claim 24, wherein the mobile stations re-register at the same switching means from which they have left the first network depending on the location of the mobile station.

26. A method according to claim 24, wherein when the mobile stations re-register at the switching means of the first network, an update location information message is sent to a home location register of the first network and the location information contained therein is compared with the location information stored when the mobile station was registered in the second network.

27. A method according to claim 1, wherein the mobile station is transferred to another second network if an overload occurs in the second network to which the mobile station has first been transferred.

28. Telecommunication system comprising a first and at least one second mobile radio communication network, wherein at least one mobile stations of the first network are temporarily granted access in the second network at predetermined operation conditions in the first network, comprising:
in the first network:
a) an operation condition detection means detecting an predetermined operation condition in the first network;
b) a first switching means including request means for sending to a second switching means of said second network a request message requesting that one or more mobile stations of the first network be handled by the second network when said predetermined operation condition is detected, the request message indicating the number of mobile stations to be handled by the second network; and
in the at least one second network:
c) a reception means for receiving said request message from said first switching means;
d) an access grant means for determining whether the second network has enough capacity to handle calls of the at least one mobile stations when said predetermined operation condition is detected and for granting access for the mobile stations if there is enough capacity;
e) a response message sending means for sending a response message to said first switching means indicating that the second network grants access to at least one mobile stations of the first network if said access grant means determines that the capacity is sufficient; and
in at least one of the first- and second network:
f) a registering means for registering the at least one mobile stations when said predetermined operation condition is detected in the second network.

29. A system according to claim 28, wherein said request message indicates at least one access class of mobile stations to be handled by the second network.

30. A method according to claim 28, wherein
said operation condition detection means detects as said predetermined operation condition an overload condition in the first network.

31. A system according to claim 30, wherein said request message indicates at least one mobile stations of the first network which cannot be handled in said first network due to said overload condition, said response message indicates that the second network grants an access to the at least one mobile stations of the first network which cannot be handled during said overload condition and the at least one mobile stations which cannot be handled in the first network are registered in said second network.

32. A system according to claim 31, wherein said first switching means comprises a reception means for receiving said response message from said second switching means and for sending an overload message to the base station controllers connected to the first switching means of the first network indicating that a roaming to the second network is allowed for at least one mobile stations which cannot be handled in the first network due to said overload condition, said base station controllers providing said overload message to the mobile stations indicated therein.

33. A system according to claim 32, wherein said overload message lists the at least one access class for which a roaming to said second network is allowed, said base station controllers providing said overload message to the mobile stations belonging to the indicated access class.

34. A system according to claim 32, wherein said overload message indicates at least one of said at least one second network to which the mobile stations are allowed to roam and a particular switching means of said at least one second networks.

35. A system according to claim 30, wherein said request message indicates information about the overload area in the first network.

36. A system according to claim 30, wherein when said operation condition detection means detects that said overload condition has ended in the first network, said first switching means sends a stop message to said second switching means, wherein said second switching means withdraws the access granting of said at least one mobile stations of the first network.

37. A system according to claim 28, wherein said operation condition detection means detects as said predetermined operation condition at least one of a maintenance condition and a switching command by at least one mobile users in said first network.

38. A system according to claim 28, wherein said request means sends said request message to at least two switching means of the second network.

39. A system according to claim 38, wherein said request means sends several request messages separately to several switching means an the second network each request message containing a number of mobile stations of a particular access group.

40. A system according to claim 28, wherein said telecommunication system comprises several second networks and said request means sends said request message to at least one switching means in each second network.

41. A system according to claim 28, wherein said telecommunication system comprises several second networks and said switching means of said first network determines on the basis of the access classes of the mobile stations in which second network at least one of said mobile stations which cannot be handled in the first network should be registered.

42. A system according to claim 28, wherein the mobile stations in the first network are located in at least one of the same location area and different location areas.

43. A system according to claim 28, wherein said registering means copies in response to receiving a registration message from the at least one mobile stations which have been granted an access in the second network, the subscriber data of the mobile stations from the home location register of the first network into said second switching means.

44. A system according to claim 28, wherein when a mobile station of the first network is in an idle state when registered in the second network, the mobile station is adapted for performing repeated re-registering requests to said first switching means.

45. A system according to claim 28, wherein said second switching means comprises a location area determining means for determining allowable location areas in the second network where said at least one mobile stations are allowed to roam in the second network.

46. A system according to claim 28, wherein when a mobile station, which has been registered in the second network, moves outside said allowable location area, said second switching means is adapted to either continue a call, or to perform an inter-network handover to the first network or to yet another second network, or to release the call.

47. A system according to claim 28, wherein the telecommunication system comprises several several second networks and said first switching means comprises scan means for scanning the several second networks if a second network has refused to take over the mobile stations during said predetermined operation condition.

48. An exchange of a first mobile radio communication network for handing over at least one mobile stations of a first network to at least one second mobile radio communication network at predetermined operation conditions in the first network, comprising
  a) an operation condition detection means detecting a predetermined operation condition in the first network;
  b) a switching means including request means for sending to a switching means of the second network a request message requesting that at least one mobile stations of the first network be handled by the second network when the predetermined operation condition is detected, the request message indicating the number of mobile stations to be: handled by the second network;
  c) a reception means for receiving a response message from a switching means of the second network indicating that the second network grants access to at least one mobile stations of the: first network when the predetermined operation condition is detected; and
  d) a registering means for registering said at least one mobile stations in the second network.

49. An exchange according to claim 48, wherein said request message indicates at least one access class of mobile stations to be handled by the second network.

50. An exchange according to claim 40, wherein
said operation condition detection means detects as the predetermined operation condition an overload condition in the first network.

51. An exchange. according to claim 50, wherein said request message indicates at least one mobile stations of the first network which cannot be handled in the first network due to said overload condition, said response message indicates that the second network grants an access to the at least one mobile stations of the first network which cannot be handled during said overload condition and said at least one mobile stations which cannot be handled in the first network are registered in the second network.

52. An exchange according to claim 51, wherein said switching means is adapted for sending an overload message to the base station controllers of the first network indicating that a roaming to the second network is allowed for at least one mobile stations which cannot be handled in the first network due to said overload condition, said base station controllers providing said overload message to the mobile stations indicated therein.

53. An exchange according to claim 52, wherein said overload message lists the at least one access class for which a roaming to said second network is allowed, said base station controllers providing said overload message to the mobile stations belonging to the indicated access class.

54. An exchange according to claim 50, wherein when said operation condition detection means detects that said overload condition has ended in the first network, said switching means of the first network sends a stop message to said switching means of the second.network for cancelling said access grant of said at least one mobile stations.

55. An exchange according to claim 48, wherein said operation condition detection means detects as the predetermined operation condition at least one of a maintenance condition and a switching command by at least one mobile users in the first network.

56. An exchange according to claim 48, wherein said registering means copies, when said at least one mobile stations sends a registration message to said switching means of the second network, the subscriber data from the home location register of the first network to said switching means of the second network.

57. An exchange according to claim 51, wherein said request message sent by said request means indicates information about the overload area in the first network.

58. An exchange according to claim 48, wherein several second networks, wherein said switching means of the first network determines on the basis of the access classes of the mobile stations in which second network at least one of the mobile stations should be registered, when the predetermined operation condition is detected.

59. A telecommunication system comprising at least two mobile radio communication networks, wherein one or more mobile stations which cannot be handled in one network are handed over to another network during predetermined operation conditions in the one network, wherein at least one network comprises one or more exchanges, wherein at least one of the exchanges includes:
  a) an operation condition detection means detecting a predetermined operation condition in the first network;
  b) a switching means including request means for sending to a switching means of the second network a request message requesting that one or more mobile stations of the first network be handled by the second network when the predetermined operation condition is detected, the request message indicating the number of mobile stations to be handled by the second network;
  c) a reception means for receiving a response message from a switching means of the second network indicating that the second network grants access to one or more mobile stations of the first network when the predetermined operation condition is detected; and
  d) a registering means for registering said one or more mobile stations in the second network.

60. An exchange according to claim 59, wherein said request message indicates at least one access class of mobile stations to be handled by the second network.

61. An exchange according to claim 59, wherein said operation condition detection means detects as the predetermined operation condition an overload condition in the first network.

62. An exchange according to claim 61, wherein said request message indicates at least one mobile stations of the first network which cannot be handled in the first network due to said overload condition, said response message indicates that the second network grants an access to the at least one mobile stations of the first network which cannot be handled during said overload condition and said at least one mobile stations which cannot be handled in the first network are registered in the second network.

63. An exchange according to claim 62, wherein said switching means is adapted for sending an overload message to the base station controllers of the first network indicating that a roaming to the second network is allowed for at least one mobile stations which cannot be handled in the first network due to said overload condition, said base station controllers providing said overload message to the mobile stations indicated therein.

64. An exchange according to claim 63, wherein said overload message lists the at least one access class for which a roaming to said second network is allowed, said base station controllers providing said overload message to the mobile stations belonging to the indicated access class.

65. An exchange according to claim 62, wherein said request message sent by said request means indicates information about the overload area in the first network.

66. An exchange according to claim 61, wherein when said operation condition detection means detects that said overload condition has ended in the first network, said switching means of the first network sends a stop message to said switching means of the second network for cancelling said access grant of said at least one mobile stations.

67. An exchange according to claim 59, wherein said operation condition detection means detects as the predetermined operation condition at least one of a maintenance condition and a switching command by at least one mobile users in the first network.

68. An exchange according to claim 59, wherein said registering means copies, when said at least one mobile stations sends a registration message to said switching means of the second network, the subscriber data from the home location register of the first network to said switching means of the second network.

69. An exchange according to claim 59, wherein several second networks, wherein said switching means of the first network determines on the basis of the access classes of the mobile stations in which second network at least one of the mobile stations should be registered, when the predetermined operation condition is detected.

70. A method for temporarily transferring at least one mobile stations of a first mobile radio communication network at overload conditions to at least one second mobile radio communication network, comprising the following steps:
  a) detecting an overload condition in the first network;
  b) sending, from a switching means of the first network to at least one switching means of the second network, at least one request message requesting that one or more mobile stations of the first network which cannot be handled in the first network due to said overload condition be handled by the second network, the at least one request message indicating the number of mobile stations to be handled by the second network;
  c) receiving a response message by the switching means of the first network from the switching means of the second network indicating that the second network grants access to one or more mobile stations of the first network which cannot be handled during said overload conditions; and d) registering said one or more mobile stations, which cannot be handled in the first network, in the at least one second network.

71. An exchange of a first mobile radio communication network for handing over one or more mobile stations of a first network to at least one second mobile radio communication network at overload conditions in the first network, comprising a) an overload detection means detecting an overload condition in the first network;

b) a switching means including request means for sending to a switching means of the second network a request message requesting that one or more mobile stations of the first network which cannot be handled in the first network due to said overload condition be handled by the second network, the request message indicating the number of mobile stations to be handled by the second network;

c) a reception. means for receiving a response message from a switching means of the second network indicating that the second network grants access to one or more mobile stations of the first network which cannot be handled during said overload conditions; and d) a registering means for registering the one or more mobile stations, which cannot be handled in the first network, in the second network.

* * * * *